United States Patent
Baptista

(10) Patent No.: US 10,316,676 B2
(45) Date of Patent: Jun. 11, 2019

(54) DEVICE FOR SEALING BETWEEN THE COAXIAL SHAFTS OF A TURBOMACHINE

(71) Applicant: SNECMA, Paris (FR)

(72) Inventor: Jonathan Boris Baptista, Maisons-Alfort (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 754 days.

(21) Appl. No.: 14/760,894

(22) PCT Filed: Dec. 12, 2013

(86) PCT No.: PCT/FR2013/053046
§ 371 (c)(1),
(2) Date: Jul. 14, 2015

(87) PCT Pub. No.: WO2014/111635
PCT Pub. Date: Jul. 24, 2014

(65) Prior Publication Data
US 2015/0330243 A1    Nov. 19, 2015

(30) Foreign Application Priority Data

Jan. 17, 2013    (FR) ..................................... 13 50387

(51) Int. Cl.
*F01D 11/00* (2006.01)
*F16J 15/44* (2006.01)

(52) U.S. Cl.
CPC .............. *F01D 11/003* (2013.01); *F16J 15/44* (2013.01); *F05D 2240/55* (2013.01);
(Continued)

(58) Field of Classification Search
CPC ...... F01D 11/003; F01D 11/02; F01D 25/183; F01D 25/186; F04D 29/08; F04D 29/10;
(Continued)

(56) References Cited

U.S. PATENT DOCUMENTS 3,276,781 A * 10/1966 Blank, Sr. ................ F16J 15/26
277/500
4,043,146 A     8/1977 Stegherr
(Continued)

FOREIGN PATENT DOCUMENTS

EP    2 420 649 A2    2/2012
FR    2 279 972 A1    2/1976

OTHER PUBLICATIONS

International Search Report as issued in International Patent Application No. PCT/FR2013/053046, dated Feb. 7, 2014.

*Primary Examiner* — Justin D Seabe
*Assistant Examiner* — Alexander A White
(74) *Attorney, Agent, or Firm* — Pillsbury Winthrop Shaw Pittman LLP

(57) ABSTRACT

A sealing device for sealing between coaxial shafts of a turbomachine, the sealing device including an elastic ring having a circular central opening allowing a sliding connection with an internal shaft, an external surface configured to engage with an internal surface of a portion of an external shaft, two retaining components situated one on either side of the elastic ring and allowing the elastic ring an axial clearance, wherein the elastic ring is a profile section.

7 Claims, 1 Drawing Sheet

(52) U.S. Cl.
CPC ...... *F05D 2240/58* (2013.01); *F05D 2240/60* (2013.01); *F05D 2240/61* (2013.01); *F05D 2250/14* (2013.01); *F05D 2250/36* (2013.01)

(58) Field of Classification Search
CPC ... F04D 29/12; F16J 15/16; F16J 15/18; F16J 15/26; F16J 15/28; F16J 15/30; F16J 15/44; F05D 2240/55; F05D 2240/58; F05D 2240/60; F05D 2240/61; F05D 2250/14; F05D 2250/36
See application file for complete search history.

(56) References Cited

U.S. PATENT DOCUMENTS

| | | | | |
|---|---|---|---|---|
| 4,211,424 | A * | 7/1980 | Stein | F01D 11/003 |
| | | | | 277/352 |
| 4,754,983 | A * | 7/1988 | Kruger | F01D 5/026 |
| | | | | 277/422 |
| 6,325,546 | B1 * | 12/2001 | Storace | F01D 21/04 |
| | | | | 384/536 |
| 6,326,546 | B1 | 12/2001 | Storace | |
| 2012/0043725 | A1 * | 2/2012 | Jahn | F01D 11/00 |
| | | | | 277/306 |

* cited by examiner

DEVICE FOR SEALING BETWEEN THE COAXIAL SHAFTS OF A TURBOMACHINE

CROSS-REFERENCE TO RELATED APPLICATIONS

This is the U.S. National Stage of PCT/FR2013/053046, filed Dec. 12, 2013, which in turn claims priority to French Patent Application No. 1350387, filed Jan. 17, 2013, the entire contents of all applications are incorporated herein by reference in their entireties.

TECHNICAL FIELD

The present invention pertains to the field of turbomachines and systems for sealing between two rotating coaxial shafts.

The present invention more particularly relates to a dynamic sealing device arranged between two rotating coaxial shafts of a turbomachine.

STATE OF THE PRIOR ART

In a turbomachine, it is necessary to define and isolate an enclosure surrounding a mechanical component such as a bearing or a pinion installed between two rotating shafts, such as for example the high pressure rotor and the low pressure rotor. In this enclosure, oil is injected to lubricate and cool the mechanical component. The isolation of the enclosure particularly requires a device for sealing between the two rotating coaxial shafts. "Internal shaft" designates the shaft of smaller diameter and "external shaft" the shaft of greater diameter.

It is known to use contactless sealing devices in this type of application. However, contactless sealing devices, of labyrinth type, require a significant air flow and it is sometimes difficult to obtain the desired pressurisation of the enclosure. Furthermore, an air-oil mixture is created in the enclosure which requires a de-oiling device before the evacuation of the air. The compromise is thus difficult to establish and these sealing devices do not always make it possible to obtain the targeted performances. Finally, this type of seal requires the presence of a de-oiling device which is expensive, bulky and heavy on account of the considerable flow of oily air to be treated.

It is also known to use contact sealing devices. Such a sealing device is intended to be mounted between an internal shaft and an external shaft. The sealing device comprises an elastic carbon ring, and two polished metal plates integral with the internal shaft and axially edging the elastic ring with a clearance—in other words, situated on either side of the elastic ring—, the axial spacing between the two polished plates being maintained by a spacer. The term axial refers to the axis along which extends the carbon ring; for example, if the carbon ring is of cylindrical shape, then the term axial refers to the axis of the cylinder.

The elastic ring is designed to be pressed radially against the reaming of the external shaft under the effect of a centrifugal force. In fact, the elastic ring is conventionally a hoop comprising a slot allowing it to open angularly. The elastic ring is of diameter greater than the internal diameter of the external shaft. It is maintained compressed during its positioning in the reaming of the external shaft, and tends to open under the effect of the centrifugal force linked to the rotation of the coaxial shafts. Thus, the elastic ring is rotationally driven by the external shaft.

Yet, under the effect of a pressure difference on either side of the sealing device, the elastic ring may be in contact with one of the polished metal plates, the latter being integral with the internal shaft. Since the internal shaft and the external shaft do not rotate at the same speed, or even in the same direction, the elastic ring can then separate from the rotation of the external shaft. The upper radial surface of the elastic ring thus tends to be ground under the effect of friction between the elastic ring and the external shaft. This grinding is at the origin of a leak reducing the efficiency of the sealing.

The elastic ring then requires periodic replacements.

GENERAL DESCRIPTION OF THE INVENTION

In this context, the invention aims to provide a sealing device, designed to operate with co-rotating or counter-rotating turning coaxial shafts, making it possible to improve the elastic ring being made integral in rotation with the external shaft.

To this end, the invention proposes a device for sealing between the coaxial shafts of a turbomachine, said device comprising an elastic ring having:
  a circular central opening allowing a sliding connection with an internal shaft,
  an external surface designed to engage with an internal surface of a portion of an external shaft,
two retaining means situated one on either side of said elastic ring and allowing said ring an axial clearance,
said elastic ring being a profile section.

"Profile section" is taken to mean a product of constant cross section over its whole length, of section different to that of bars, wires, tubes, sheets or strips. The cross section of a profile section is particularly not circular. A cylinder or a hoop is thus not a profile section. It is pointed out that a cross section is a section along a plane orthogonal to the axis along which extends the ring, the ring extending between the two retaining means.

In an embodiment, the retaining means comprise two polished metal plates. In an embodiment, the retaining means are integral with the internal shaft; for example, the retaining means comprise a central opening allowing them to be positioned around the internal shaft. The retaining means are situated one on either side of the elastic ring, they axially edge the elastic ring while allowing the elastic ring an axial clearance. The term axial refers to the axis along which extends the elastic ring. A width of the elastic ring is defined along this axis, even if said width is potentially low. In an embodiment, the axial spacing between the retaining means is maintained by a spacer.

The elastic ring according to the invention is such that its external surface has a shape allowing the elastic ring and the external shaft to be integral in accordance with a rotational movement around an axis of rotation of the external shaft. In fact, the external surface of the elastic ring is not of circular section. When the elastic ring is assembled by opposition of shape to an external shaft comprising a portion of which the internal surface is of cross section of shape complementary to the cross section of the external surface of the elastic ring, a rotation of the ring with respect to the external shaft is prevented.

According to an embodiment of the invention, the external surface of the elastic ring is of multi-lobe cross section. "Multi-lobe shape" is taken to mean a shape including at least two lobes, a lobe being a curvilinear line. An oval is thus a multi-lobe shape. "Double oval", also called "flower petal", shapes are also multi-lobe shapes In particular, according to an embodiment of the invention, the external surface of the elastic ring is of oval cross section. An egg shape is for example an oval. It is noted that a circle is not an oval. An elastic ring of which the external surface is of oval cross section is easy to machine.

According to a preferred embodiment, the external surface of the elastic ring is of elliptical cross section. It is noted that an ellipse is an oval. An elastic ring of which the external surface is of elliptical cross section is particularly easy to machine.

According to a particular embodiment, the elastic ring comprises a slot allowing an angular opening of said ring. Thus, under the effect of the centrifugal force linked to the rotation of the coaxial shafts, the elastic ring tends to open and to be pressed against the internal surface of the external shaft, which contributes to making the ring integral in rotation with the external shaft.

The subject matter of the invention is also a transmission assembly comprising an external shaft of a turbomachine comprising two coaxial shafts—an internal shaft and an external shaft—and a sealing device as evoked previously.

The subject matter of the invention is also a transmission assembly comprising:
- an external shaft of a turbomachine comprising two coaxial shafts, including a portion of which an internal surface is of multi-lobe cross section, said internal surface being designed to engage with an external surface of an elastic ring of a sealing device according to the invention,
- a sealing device according to the invention, the external surface of the elastic ring being of multi-lobe cross section.

The external shaft thus comprises a portion of which an internal surface is designed to engage with an external surface of an elastic ring of a sealing device according to the invention, said internal surface having a shape such that the elastic ring and the external shaft are integral in accordance with a rotational movement around an axis of rotation of the external shaft.

In particular, according to an embodiment of the invention, the internal surface of the external shaft is of oval cross section, and the external surface of the elastic ring is of oval cross section.

In particular, according to an embodiment of the invention, the internal surface of the external shaft is of elliptical cross section, and the external surface of the elastic ring is of elliptical cross section.

BRIEF DESCRIPTION OF THE FIGURES

Other characteristics and advantages of the invention will become clearer from the description that is given thereof below, by way of indication and in no way limiting, with reference to the appended figures, among which.

DETAILED DESCRIPTION OF AT LEAST ONE EMBODIMENT

In all the figures, common elements bear the same reference numbers unless stated otherwise.

Figure 1:
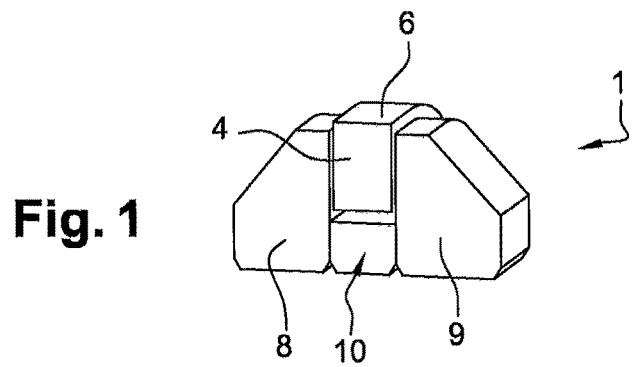
FIG. 1 schematically illustrates a device for sealing between the coaxial shafts of a turbomachine, according to an embodiment of the invention, making it possible to isolate two enclosures at different pressure, FIG. 2 schematically illustrates the sealing device of FIG. 1 in position between an internal shaft and an external shaft, FIG. 3 schematically illustrates an elastic ring of the sealing device of FIG. 1, according to an embodiment of the invention.
Figure 2:
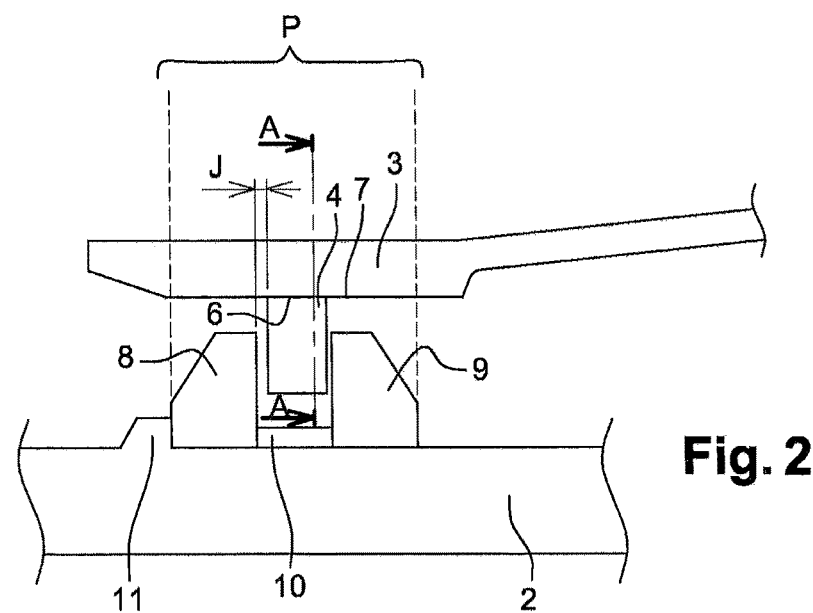

FIG. 1 is a perspective view of a section of a device 1 for sealing between the shafts of a turbomachine. In FIG. 2, said sealing device 1 is shown positioned between an internal shaft 2 and an external shaft 3, the internal shaft 2 and the external shaft 3 being coaxial. Finally, a transversal sectional view of the elements of FIG. 2 along a sectional plane AA is represented in FIG. 3.

The sealing device 1 comprises:
- an elastic ring 4 of carbon or metal type, having:
  - a circular central opening 5 allowing a sliding connection with the internal shaft 2,
  - an external surface 6 designed to engage with an internal surface 7 of a portion P of the external shaft 3. It is noted that said portion P may be the whole length of the external shaft 3.
- two polished metal plates 8, 9, also called retaining means, situated one on either side of said elastic ring 4 and allowing said elastic ring 4 an axial clearance J. The polished metal plates 8, 9 are integral with the internal shaft 2.
- a spacer 10 integral with the internal shaft 2 making it possible to maintain spaced apart the two polished metal plates 8, 9 during the operation of the turbomachine.

The internal shaft 2 advantageously comprises a positioning stop 11 making it possible to facilitate the mounting and the positioning of the sealing device 1.

Figure 3:
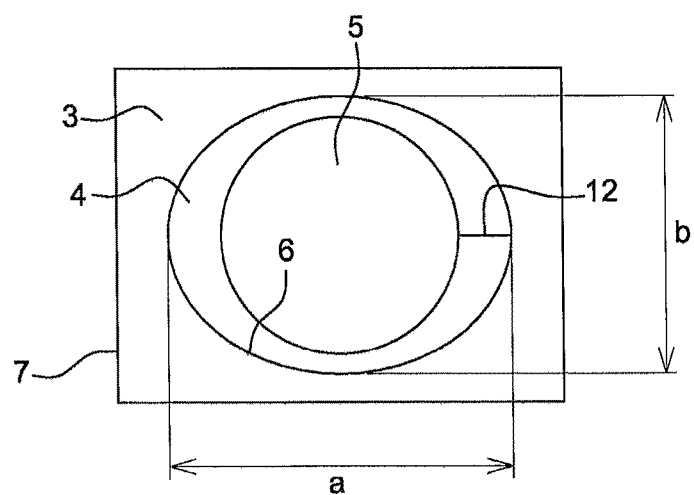

As FIG. 3 shows, the external surface 6 of the elastic ring 4 is of elliptical cross section. Similarly, the internal surface 7 of the portion P of the external shaft 3 is of elliptical cross section. An ellipse is in fact a simple machining shape. The external surface 6 of the elastic ring 4 and the internal surface 7 of the portion P of the external shaft 3 are of complementary shapes.

Advantageously, the ratio between the semi-major axis a and the semi-minor axis b is greater than 1.05 in order to maximise the geometric constraint, within the limit of the manufacturing constraints of the external shaft 3 and the elastic ring 4.

In other embodiments of the invention, the external surface 6 of the elastic ring 4 and the internal surface 7 of the portion P of the external shaft 3 are of non-elliptical oval shape, or instead of non-oval multi-lobe shape, for example of "double oval" or "flower petal" shape.

The important characteristic of the external surface 6 of the elastic ring 4 and the internal surface 7 of the portion P of the external shaft 3 is not to be of circular section, in order to secure in rotation the elastic ring 4 and the external shaft 3 in accordance with a rotational movement around the axis of rotation of the coaxial axes.

The elastic ring 4 is thus a profile section, that is to say a product of constant cross section over its whole length, of section different to that of bars, wires, tubes, sheets or strips. In fact, the external surface 6 of the elastic ring 4 is of non-circular cross section, unlike that of a tube.

The elastic ring 4 advantageously comprises a slot 12 allowing an angular opening of said elastic ring 4, as illustrated in FIG. 3. Thus, under the effect of the centrifugal force linked to the rotation of the coaxial shafts 2, 3, the elastic ring 4 tends to open and be pressed against the internal surface 7 of the external shaft 3, which contributes to making the elastic ring 4 integral in rotation with the external shaft 3.

The invention claimed is:

1. A sealing device for sealing between rotating coaxial shafts of a turbomachine, said sealing device comprising:
    an elastic ring having:
        a circular central opening allowing a sliding connection with an internal shaft,
        an external surface configured to engage with an internal surface of a portion of an external shaft, and
        two metal plates situated one on either side of said elastic ring and allowing said elastic ring an axial clearance,
        wherein the elastic ring is a profile section and wherein the external surface of the elastic ring has a shape that is configured to prevent a rotation of the elastic ring with respect to the external shaft, and wherein the external surface of the elastic ring is of oval cross section.

2. The sealing device according to claim 1, wherein the external surface of the elastic ring is of elliptical cross section.

3. The sealing device according to claim 1, wherein the elastic ring comprises a slot allowing an angular opening of said elastic ring.

4. The sealing device according to claim 1, wherein the shape of the external surface is such that the elastic ring and the external shaft are integral in accordance with a rotational movement around an axis of rotation of the external shaft.

5. The sealing device according to claim 1, wherein the two metal plates are integral with the internal shaft.

6. A transmission assembly comprising:
    an external shaft of a turbomachine comprising two coaxial shafts, including a portion of which an internal surface is of oval cross section, and
    a sealing device according to claim 1, said internal surface of the portion of the external shaft being configured to engage with the external surface of the elastic ring of the sealing device, and the external surface of the elastic ring is of oval cross section.

7. The transmission assembly according to claim 6, wherein the internal surface of the external shaft is of elliptical cross section, and the external surface of the elastic ring is of elliptical cross section.

* * * * *